2 Sheets--Sheet 1.

W. S. SAMPSON.

Lime-Kiln.

No. 6,494.

Reissued June 22, 1875.

Witnesses:
A. L. Hawson
Homer S. Beardsley

Inventor:
Wm S. Sampson

2 Sheets--Sheet 2.

W. S. SAMPSON.

Lime-Kiln.

No. 6,494.

Reissued June 22, 1875.

Witnesses:

Homer S Beardsley.

W S Sampson Jr

Inventor:

Wm S. Sampson

By A. L. Munson

Atty.

UNITED STATES PATENT OFFICE.

WILLIAM S. SAMPSON, OF NEW YORK, N. Y., ASSIGNOR OF ONE-HALF INTEREST TO HOMER S. BEARDSLEY, OF SAME PLACE.

IMPROVEMENT IN LIMEKILNS.

Specification forming part of Letters Patent No. 149,415, dated April 7, 1874; reissue No. 6,494, dated June 22, 1875; application filed January 21, 1875.

DIVISION A.

*To all whom it may concern:*

Be it known that I, WILLIAM S. SAMPSON, of the city, county, and State of New York, have invented certain new and useful Improvements in Furnaces or Kilns for the Calcining of Lime and Roasting of Ores; and I do hereby declare that the following is a full, clear, and exact description of the same.

The object of my invention is to provide a furnace or kiln constructed of masonry which shall, in its form of construction, possess great strength and endurance, and obviate all danger of cracking or rupturing of its walls.

It is formed of double walls of masonry, of brick or stone, as may be preferred, and an inner wall of lining of fire-brick. It is made cylindrical in form of shape, and slightly tapering from its apex to the base. The masonry comprising the outer double wall is laid in sections, and the whole structure is bonded and tied rigidly together by means of a series of bond-plates laid in between each section of masonry. From the top to the bottom of the walls the bond-plates are tied together by a series of tie-rods extending from plate to plate and fastened with suitable nuts, so that they may be adjusted when needed; the construction, adaptation, and operation of which will be fully described and pointed out.

Figure 1:
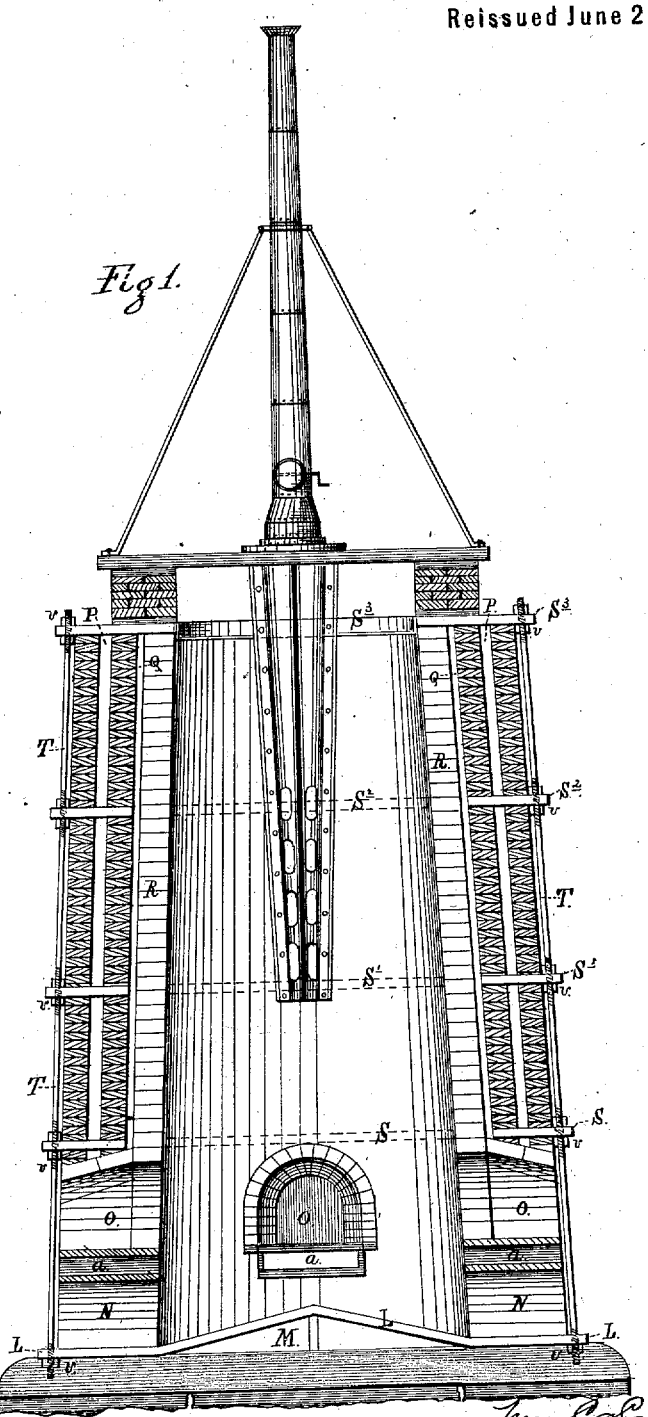
Figure 3:
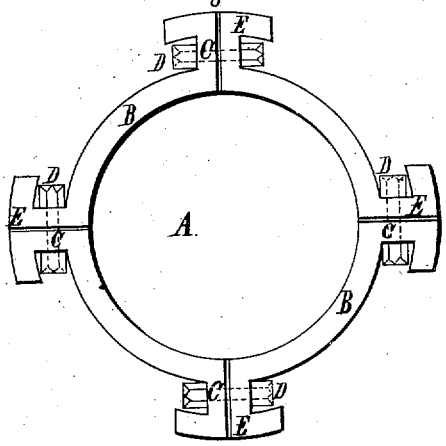
Figure 2:
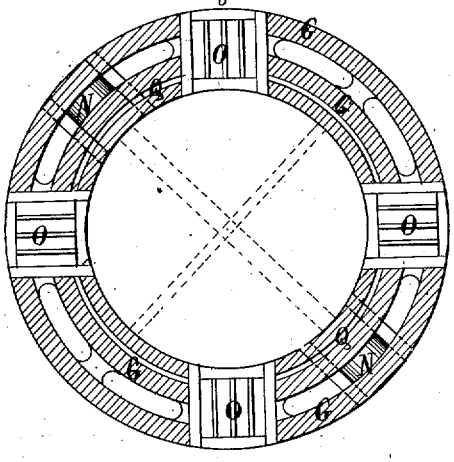

In the drawings which form a part of this specification, Figure 1 is a vertical sectional elevation of a furnace or kiln embodying my invention. Fig. 2 is a horizontal section taken on line *x x* in Fig. 1. Fig. 3 is an enlarged horizontal section of the flue, taken on line *z z* in Fig. 1.

Similar letters of reference indicate corresponding parts.

L is the metal base-plate and bottom or first bond-plate, on which the first section of masonry is laid. It rests on its outer portion on a solid foundation of stone or brick masonry.

Below it, at its center, is an air chamber or space, M, for the purpose of allowing fresh air to come in contact with its under side, thus keeping it cool when the mass of heated material composing the charge in the furnace or kiln is resting upon it after the material has fallen below the lines of fires, in the fire-chambers, preparatory to being withdrawn through the draw-doors arranged for that purpose. This base-plate is elevated in cone form toward the center of the furnace or kiln in order to chute the calcined or roasted material toward the draw-doors N through which it is withdrawn. This cone-shaped form of construction also gives it additional strength to bear the weight of the load of material resting upon it when the furnace or kiln is fully charged. N N represents the draw-doors from which the calcined or burned material is drawn; they are formed in the first section of masonry at the base of the kiln, and between the base or first and the second bond-plate. O O represent the fire-chambers, in which the heat is generated from coal, wood, or other suitable material. These fire-chambers may be four in number, more or less, according to the size and capacity of the furnace or kiln, in order that the furnace or kiln may be practically surrounded with a line of fires. They are usually formed in the first tier of masonry composing the section between the base bond-plate L, and the second bond-plate, S. They are lined with fire-bricks in the usual manner in such cases. *a a a* are the ash-pits immediately beneath the fire-chambers. G is the outer wall of the furnace or kiln. G′ is the inner wall, both composed of the same masonry material, which may be of brick or of stone. P represents an opening or air-space the entire height of the furnace-walls. This air-space is for the purpose of allowing a free circulation of air from the bottom air-chamber, M, up between the walls, keeping them cool and at an even state of temperature.

These air-passages between the walls G and G′ communicate with the air-chamber M by means of openings in between the masonry composing the foundation on which the furnace or kiln rests. This passage of air will prevent the cracking or rupturing of the walls from the effects of the intense heat generated in the furnaces from so many fires. R R represent the inner wall or lining of the furnace.

It is composed of the fire-brick ordinarily used for that purpose in the common furnaces or kilns. Q represents a narrow dead-air space formed between the inner lining of fire-brick R and the wall G′. This is for the purpose of permitting a circulation of air between the walls; also for the purpose of permitting the fire-brick lining to freely expand without affecting the walls G and G′. S, $S^1$, $S^2$, and $S^3$ represent the series of bond-plates, which, with bond-plate L, divide the masonry in the walls G and G′ into a series of horizontal sections. They are made somewhat wider than the walls G and G′, and project outside of the outer furnace-wall sufficiently for permitting the passage through them of the tie-rods T. These tie rods extend from one bond-plate to the other, from the bottom plate L at the base to the top plate $S^3$ at the apex of the furnace or kiln. They may be of any desired number, and placed at such intervals as will give the needed strength to bind the whole series of plates, with the masonry intervening, rigidly together. They are, at both top and bottom, provided with suitable screw-threads and nuts *v v v v* for tightening them up from time to time, as may become necessary. The bond-plates S, $S^1$, $S^2$, and $S^3$ are provided with a series of openings or slots, V, (shown plainly in Fig. 3 of the drawings,) at successive points in the circle, conforming in outline with the air-space P in the walls G and G′, for allowing the passage of air through the air-space P, as before described. The bottom plate L, which forms the base-plate, also has similar openings in it corresponding to those in the plates S.

The advantages gained by constructing a furnace or kiln on the plan as herein described are, first, a great increase of strength in the walls; second, the great facility with which repairs, when needed, can be made in any one section of masonry between the bond-plates without disturbing the sections above or below the damaged section. This is obvious, as each section of masonry between the bond-plates is supported and held rigidly in place, entirely independent of the other sections. Third, the permission of a free circulation of fresh air between the walls of masonry, for the purpose of keeping the walls cool, thus avoiding the disastrous results that so frequently occur in the ordinary furnaces or kilns from expansion, which ruptures and breaks up the masonry of the walls; fourth, to admit of the expansion of the fire-brick lining of the furnace without affecting the exterior wall of masonry; fifth, by binding the masonry of the walls in this manner each square inch or square foot of the walls is clamped with the same pressure; hence the expanding strain upon the masonry is immediately taken up and sustained by the several bond-plates in their tensile resistance.

Combined with this form of furnace or kiln, constructed as herein described, I propose to use my central draft-flue, which is fully described in an application for a patent of even date herewith.

In Fig. 1 I have shown this flue in position ready for use, and in Fig. 4 I show an enlarged cross-section of the same.

This form of furnace or kiln is not only designed for the calcining of limestone and the roasting of ores, but to the burning of cement and plaster, oyster-shells, and similar materials. This method of construction is also applicable to blast-furnaces for some purposes of strength.

Having thus fully described my invention, what I claim as new, and desire to secure by Letters Patent, is—

1. In a furnace or kiln designed for the calcining of lime, the roasting of ores, and the burning of cement and plaster, or similar materials, the combination of the cone-shaped bond-plate L at the bottom of a furnace or kiln, the series of bond-plates S, $S^1$, $S^2$, and $S^3$, more or less in number, all provided with the slots or openings V, with the horizontally-divided sections of the masonry, composing the walls G and $G^1$, the whole rigidly tied together by means of a series of tie-rods, T, and nuts *v*, all substantially as and for the purposes as herein shown and described.

2. In a furnace or kiln, the walls of which are divided into a series of horizontal sections by means of bond-plates, and constructed as herein described, the air-space P formed between such walls from apex to base, as and for the purposes as set forth.

In testimony whereof I have hereunto set my hand and affixed my seal this 8th day of April, 1875.

WM. S. SAMPSON. [L. S.]

In presence of—

A. L. MUNSON,

HOMER S. BEARDSLEY.